Feb. 3, 1925.
J. MATSON
1,524,940
AUTOMATIC HOPPER FEED FOR WORK PIECES
Filed March 15, 1923
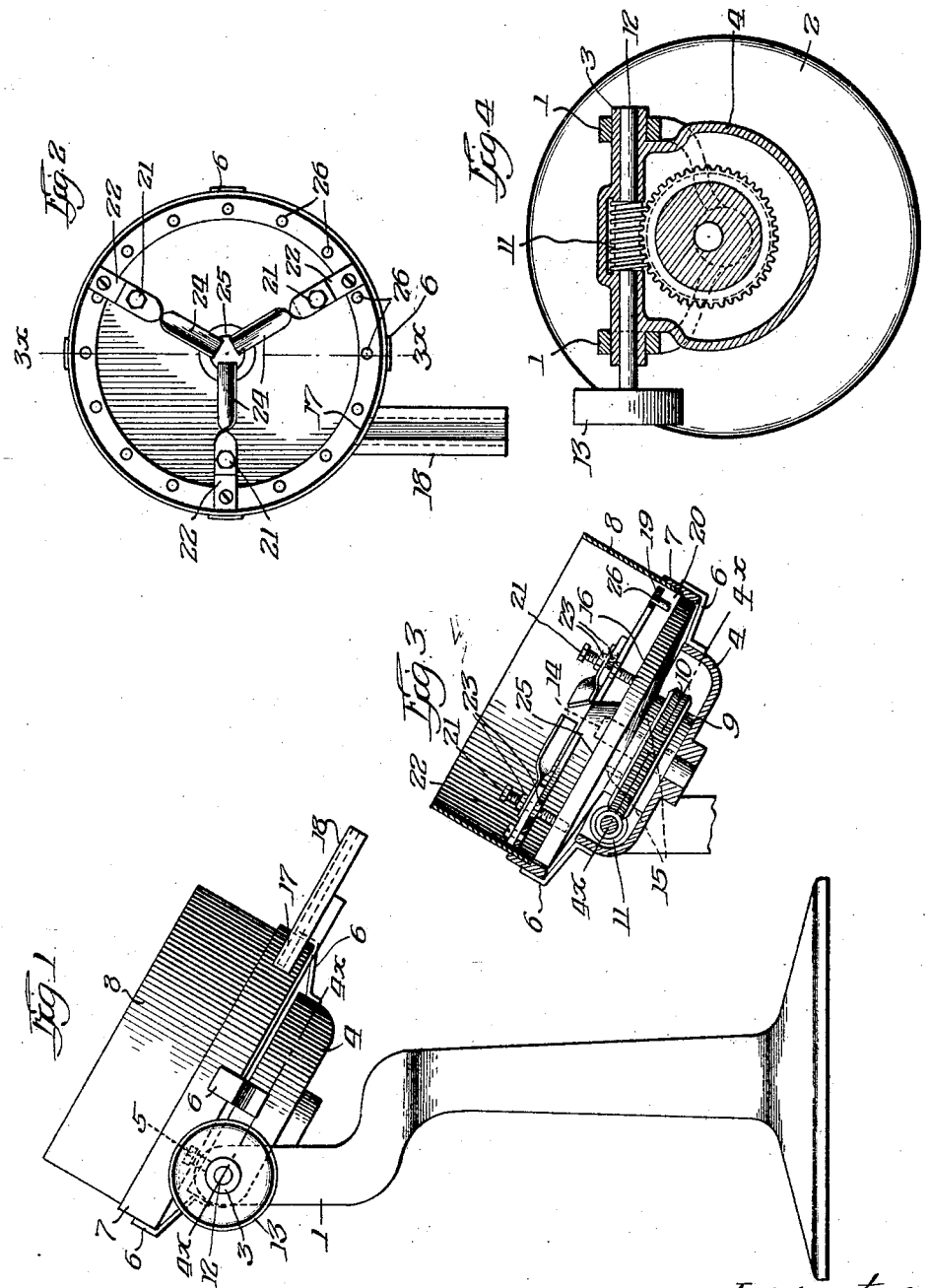

Patented Feb. 3, 1925.

1,524,940

UNITED STATES PATENT OFFICE.

JAMES MATSON, OF CHICAGO, ILLINOIS, ASSIGNOR TO F. J. LITTELL MACHINE CO., OF CHICAGO, ILLINOIS, A CORPORATION OF ILLINOIS.

AUTOMATIC HOPPER FEED FOR WORK PIECES.

Application filed March 15, 1923. Serial No. 625,430.

*To all whom it may concern:*

Be it known that I, JAMES MATSON, a citizen of the United States, residing at Chicago, in the county of Cook and State of Illinois, have invented certain new and useful Improvements in Automatic Hopper Feed for Work Pieces, of which the following is a specification.

This invention relates to mechanism for feeding work-pieces to riveting presses, assembling machines, or the like, and is designed particularly to feed, individually and seriatim, work-pieces that are thrown into a hopper indiscriminately and in bulk.

The invention proceeds upon the principle of providing within the hopper a rotary member, preferably the bottom of the hopper, or at least a circumferential portion thereof, which is constructed with a vertically restricted laterally opening slot-like space that admits the individual work-pieces from the lower stratum of the mass and permits them to gradually find their way to a gate through which they escape from the hopper, the recess being preferably formed by spacing above the rotary bottom, and coinciding with the annular marginal area thereof, a ring which holds back from the recess any work-pieces that may be superposed upon work-pieces in the lowermost stratum, thereby preventing jamming of the pieces and insuring release of the individual pieces as they reach the gate. A suitable chute conducts the pieces from the gate to the place of use, and the ring which forms the recess through which the pieces gain access to the gate being supported on the plate by means which renders the ring adjustable to develop spaces of different vertical dimensions corresponding to different work-pieces that are to be fed.

In order to regulate the influence of gravity upon the feed, the hopper is mounted with angular adjustment that permits the gate to be depressed and the revolving bottom to be inclined to a greater or less angle at will; and in order to increase the agitating effect of the revolving portion of the hopper upon the contained mass of work-pieces, displacing fingers, preferably of cork, leather, or other material of high frictional value, are made to depend from the ring in position to engage the work-pieces and assist them in entering the recess.

The preferred embodiment of the invention is illustrated in the accompanying drawing, in which—

Figure 1 is a side elevation of a hopper feed apparatus embodying the several features of the invention.

Figure 2 is a top plan view of the same.

Figure 3 is a section on the line $3^x$—$3^x$ of Figure 2; and

Figure 4 is a section on the line $4^x$—$4^x$ of Figures 1 and 3.

In the fork 1 of any suitable form of standard 2, and through the medium of trunnions 3, is mounted a base 4 to be held at any angle of adjustment through means of a set screw 5 or other appropriate means for resisting rotation of its said trunnions in the fork. Supported on the base 4 by arms 6, or other suitable means, is an annular curb 7 adapted to receive the cylindrical wall 8 of the hopper. Rotatably mounted within the base 4 is a turning head 9 carrying a worm wheel 10 in mesh with the driving screw 11 on the shaft 12 which is driven through pulley 13 by power from any suitable source. Supported upon the turning head 9, through the medium of the centering arbor 14 and receiving rotary drive from the head through means of dowels 15, is a rotary plate 16 which constitutes the bottom of the hopper, by which the mass of work-pieces which are to be fed by the hopper are mainly sustained until they pass by gravity through a gate 17 (Figures 1 and 2) into a chute 18 or other receptacle provided to receive them.

An important problem in the orderly and constant delivery of work-pieces from a hopper, even where there is a rotary bottom which keeps the lower stratum of the pieces in agitation, arises from a tendency of the pieces to bind one against another and form a jam around the gate. The present invention overcomes this difficulty by providing above the rotary bottom 16 a plate-like member 19 approximately corresponding in diameter to that of the rotary bottom, and spaced therefrom a distance that will enable it to restrict the number of work-pieces that gain access to the marginal portion of the rotary bottom and therefore to the gate 17; in other words, the plate 19 forms with the rotary bottom a feeding receptacle 20 of a dimension perpendicular to the bottom which preferably restricts the work-pieces of the lowermost stratum to access to the gate 17. Plate 19 is preferably in the form of a ring of relatively small radial section, in order to leave the inner portion of the circle which it defines open and free for the bulk of the work-pieces to gain access to the bottom. To support the plate 19 over the bottom 16 screws 21 are preferably employed. These may be three in number and they may support this plate 19 through means of radial arms 22. These screws may be threaded into the rotary bottom 16 and support the arms 22 through means of nuts 23 above and below the arms, thus providing for gauging the distance between the plate 19 and the bottom 16 at will.

Projecting inwardly and revolving with the plate 19 are agitating vanes 24, and these are conveniently mounted upon the arms 22 and made to terminate above the central boss 25 of the bottom 16. Plate 19 is preferably provided with additional stirring devices in the form of studs 26 projecting from the plate toward the bottom 16, and these studs may be of leather, rubber, or other material equivalent thereto in capacity to exert friction upon the work-pieces and move them about upon the bottom to change their angular position and gradually get them into proper presentation to pass through the gate 17.

It will be noted that the gate 17 is not at the lowermost point in the periphery of the rotary bottom 16, but at a substantial angular distance above the same, measured in the direction of rotation of the bottom, so that work-pieces are induced to settle by gravity into the segregating space 20 in a series of single thickness and properly align themselves along the periphery before reaching the gate toward which they will be moved by the friction pins 26.

I claim:

1. In a hopper feed for work-pieces, a confining wall having a gate through which the pieces are to be fed, a rotary bottom member upon which the pieces rest and by which they are advanced toward the gate, and a plate above said bottom member in position to form therewith a segregating space which the pieces enter before reaching the gate; said plate being mounted to rotate with the bottom, and being adjustable in its distance from the bottom to define a segregating space adapted to the thickness of the work-pieces to be fed.

2. In a hopper feed for work-pieces, a confining wall having a gate through which the pieces are to be fed, a rotary bottom member upon which the pieces rest and by which they are advanced toward the gate, and a plate above said bottom member in position to form therewith a segregating space which the pieces enter before reaching the gate; said plate having supporting screws through which it is connected with the bottom to rotate therewith.

3. In a hopper feed for work-pieces, a confining wall having a gate through which the pieces are to be fed, a rotary bottom member upon which the pieces rest and by which they are advanced toward the gate, and a plate above said bottom member in position to form therewith a segregating space which the pieces enter before reaching the gate; said plate comprising an annular portion carrying agitating arms extending radially inward therefrom.

4. In a hopper feed for work-pieces, a confining wall having a gate through which the pieces are to be fed, a rotary bottom member upon which the pieces rest and by which they are advanced toward the gate, and a plate above said bottom member in position to form therewith a segregating space which the pieces enter before reaching the gate; said bottom having a central boss extending axially upward therefrom, and said plate being in the form of an annulus and carrying agitating arms extending radially inward and terminating over said boss.

Signed at Chicago, Illinois, this 28 day of February, 1923.

JAMES MATSON.